(12) United States Patent
Cheekatla et al.

(10) Patent No.: US 9,313,673 B2
(45) Date of Patent: Apr. 12, 2016

(54) AVOIDING FORBIDDEN CELL RESELECTIONS IN MULTIMODE NETWORKS

(71) Applicant: QUALCOMM Incorporated, San Diego, CA (US)

(72) Inventors: Phaneendra Cheekatla, Andhrapradesh (IN); Atul Kumar Maurya, Andhrapradesh (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/081,811

(22) Filed: Nov. 15, 2013

(65) Prior Publication Data
US 2015/0141004 A1    May 21, 2015

(51) Int. Cl.
*H04W 4/00* (2009.01)
*H04W 24/02* (2009.01)
*H04W 24/08* (2009.01)
*H04W 8/00* (2009.01)
*H04W 36/00* (2009.01)
*H04W 48/20* (2009.01)

(52) U.S. Cl.
CPC .............. *H04W 24/02* (2013.01); *H04W 8/00* (2013.01); *H04W 24/08* (2013.01); *H04W 36/0088* (2013.01); *H04W 48/20* (2013.01)

(58) Field of Classification Search
CPC .. H04L 63/0428; H04W 48/16; H04W 16/14; H04W 36/0072; H04W 48/08; H04W 48/18; H04W 52/0241; H04W 84/045; H04W 12/08; H04W 12/10

USPC ........................................................ 455/434
See application file for complete search history.

(56) References Cited

U.S. PATENT DOCUMENTS

| 5,794,146 | A   | * | 8/1998  | Sevcik et al. ................ 455/434 |
| 7,483,702 | B2  |   | 1/2009  | Yeo et al. |
| 8,289,925 | B2  |   | 10/2012 | Ore et al. |
| 8,311,497 | B2  | * | 11/2012 | Keshav et al. ............ 455/161.1 |
| 2007/0184834 | A1 |  | 8/2007  | Jeong et al. |
| 2008/0188215 | A1 |  | 8/2008  | Bergstrom et al. |
| 2008/0233959 | A1 |  | 9/2008  | Klatt |
| 2009/0075690 | A1 |  | 3/2009  | Roberts et al. |
| 2010/0015973 | A1 | * | 1/2010  | Islam et al. ................... 455/434 |
| 2010/0234010 | A1 |  | 9/2010  | Fischer |
| 2010/0323663 | A1 |  | 12/2010 | Vikberg et al. |
| 2013/0258883 | A1 |  | 10/2013 | Vargas Bautista et al. |

FOREIGN PATENT DOCUMENTS

EP        2632205 A1    8/2013

OTHER PUBLICATIONS

ISA/EPO, International Search Report and Written Opinion of the International Searching Authority, Int'l. App. No. PCT/US2014/064753, Feb. 25, 2015, European Patent Office, Rijswijk, NL, 17 pgs.

* cited by examiner

*Primary Examiner* — Kwasi Karikari
(74) *Attorney, Agent, or Firm* — Holland & Hart LLP

(57) ABSTRACT

Methods, systems, and devices for wireless communications are described. According to these techniques, a user equipment (UE) may determine that the UE is in a serving cell, identify at least one forbidden neighbor cell while the UE is in the serving cell, and adjust a measurement interval of the at least one forbidden neighbor cell while the UE is in the serving cell.

26 Claims, 10 Drawing Sheets

AVOIDING FORBIDDEN CELL RESELECTIONS IN MULTIMODE NETWORKS

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. Some wireless multiple-access communications systems may include cells that utilize different radio access technologies (RATs).

Cell reselection is a procedure by which a mobile device that is camped on a serving cell may select and move to a new serving cell. The mobile device periodically performs measurements of neighboring cells to determine possible reselection targets. When a suitable target is identified, the mobile device may camp on the identified target cell to complete the reselection. In some cases, one or more neighboring cells may be unsuitable for reasons that are not apparent to the physical layer and radio resource control layer of the mobile device. Thus, the mobile device may measure and attempt to reselect an unsuitable cell, resulting in the unnecessary expenditure of processing resources and a possible loss of service.

SUMMARY

The described features generally relate to one or more improved systems, methods, and/or apparatuses for reducing inter-RAT measurements in a wireless communications system. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

According to a first set of illustrative embodiments, a method of wireless communication may include determining that a user equipment (UE) is in a serving cell; identifying at least one forbidden neighbor cell while the UE is in the serving cell; and adjusting a measurement interval of the at least one forbidden neighbor cell while the UE is in the serving cell.

In certain examples, a neighbor cell list received that includes the at least one forbidden neighbor cell may be received. Adjusting the measurement interval of the at least one forbidden neighbor cell may occur while the UE is in an idle mode. Adjusting the measurement interval of the at least one forbidden cell may include increasing the measurement interval by a measurement interval factor.

In certain examples, the at least one forbidden neighbor cell may include a first forbidden neighbor cell and a second forbidden neighbor cell. In such examples, adjusting the measurement interval may include adjusting a first measurement interval of the first forbidden neighbor cell according to a first measurement interval factor and adjusting a second measurement interval of the second forbidden neighbor cell according to a second measurement interval factor. In some cases, the first measurement interval factor may be different from the second measurement interval factor. A signal strength of the at least one forbidden neighbor cell may be measured, and the measurement interval factor may be based on the signal strength of the at least one forbidden neighbor cell.

In certain examples, the measurement interval factor may increase as the signal strength of the at least one forbidden neighbor cell increases. Increasing the measurement interval may include determining if the signal strength of the at least one forbidden neighbor cell satisfies one or more signal strength thresholds.

In certain examples, increasing the measurement interval may include increasing the measurement interval by a first measurement interval factor if the signal strength satisfies a first signal strength threshold, and increasing the measurement interval by a second measurement interval factor if the signal strength satisfies a second signal strength threshold. The second signal strength threshold may be greater than the first signal strength threshold. The second measurement interval factor may be greater than the first measurement interval factor. Different radio access technologies (RATs) may be associated with the serving cell and the at least one forbidden neighboring cell.

According to a second set of illustrative embodiments, an apparatus for wireless communication may include at least one processor and a memory communicatively coupled with the at least one processor. The at least one processor may be configured to execute code stored on the memory to: determine that a user equipment (UE) is in a serving cell; identify at least one forbidden neighbor cell while the UE is in the serving cell; and adjust a measurement interval of the at least one forbidden neighbor cell while the UE is in the serving cell.

In certain examples, the at least one processor may be configured to execute code stored on the memory to implement one or more aspects of the first set of illustrative embodiments described above.

According to a third set of illustrative embodiments, an apparatus for wireless communication may include means for determining that a user equipment (UE) is in a serving cell; means for identifying at least one forbidden neighbor cell while the UE is in the serving cell; and means for adjusting a measurement interval of the at least one forbidden neighbor cell while the UE is in the serving cell.

In certain examples, the apparatus may include means for implementing one or more aspects of the first set of illustrative embodiments described above.

According to a fourth set of illustrative embodiments, a computer program product may include a non-transitory computer-readable medium having computer-readable code. The computer-readable code may be configured to cause at least one processor to: determine that a user equipment (UE) is in a serving cell; identify at least one forbidden neighbor cell while the UE is in the serving cell; and adjust a measurement interval of the at least one forbidden neighbor cell while the UE is in the serving cell.

In certain examples, the computer readable code may be configured to cause the at least one processor to implement one or more aspects of the first set of illustrative embodiments described above.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
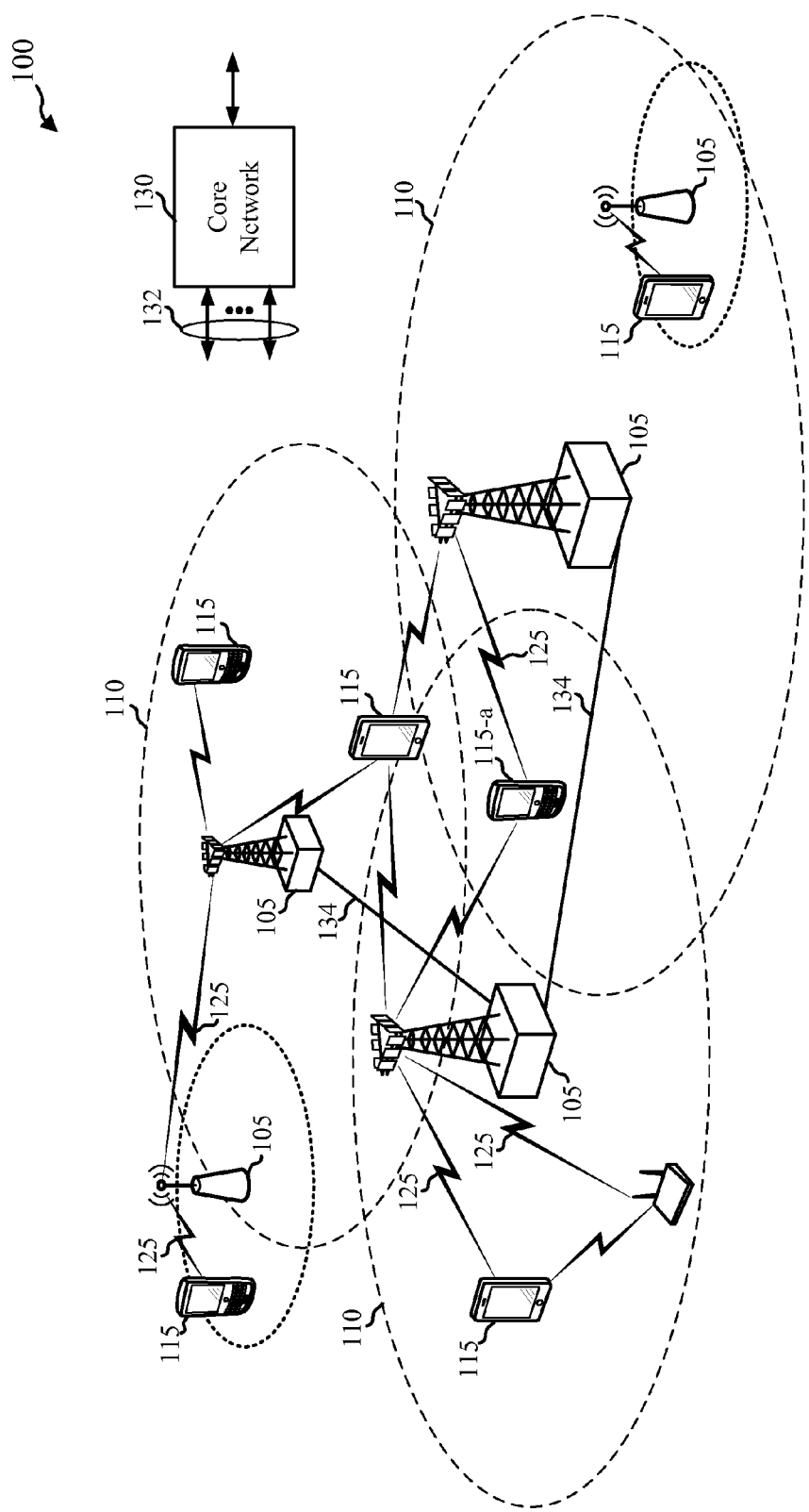
FIG. 1 shows a block diagram of a wireless communications system.

The present disclosure describes techniques for reducing inter-RAT cell measurements in a wireless communications system. According to these techniques, a user equipment (UE) in a serving cell may periodically perform measurements of neighbor cells, and identify one or more forbidden neighbor cells. The measurements may be performed on different operating frequencies. Because the forbidden neighbor cell(s) may not be viable reselection targets for the UE, it may be possible to perform measurements on an operating frequency associated with a forbidden neighbor cell less frequently than an operating associated with a cell that is not forbidden. Thus, the UE may adjust a measurement interval of the one or more forbidden neighbor cells while the UE remains camped on the serving cell. The user equipment may also adjust the measurement interval of the one or more forbidden neighbor cells based on the measurements performed on the forbidden neighbor cell(s). In certain examples, the measurement interval may be adjusted according to a measurement interval factor, which may be based on a comparison of a measured signal strength to a signal strength threshold.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments. The following description uses the terms eNodeB and base station interchangeably.

As used in the present description and the appended claims, the term "cell reselection" or "reselection" refers to an idle mode procedure during which a UE that is currently camped on a first serving cell identifies a second serving cell on which to camp and camps on the second serving cell.

As used in the present description and the appended claims, the term "handover" refers to a connected mode procedure during which a UE connected to a first serving cell identifies a second serving cell and transitions an open network connection to the second serving cell.

As used in the present description and the appended claims, the term "forbidden neighbor cell" refers to a cell that is forbidden as a reselection or handover target for a UE by a non-access stratum (NAS) of the UE or a network, upper layers of the UE or a network, and/or according to a preferred roaming list (PRL) for the UE.

FIG. 1 is a block diagram conceptually illustrating an example of a wireless communications system 100, in accordance with an aspect of the present disclosure. The wireless communications system 100 includes base stations 105, user equipment (UEs) 115, and a core network 130. The base stations 105 may communicate with the UEs 115 under the control of a base station controller (not shown), which may be part of the core network 130 or the base stations 105 in various embodiments. The base stations 105 may communicate control information and/or user data with the core network 130 through first backhaul links 132. In embodiments, the base stations 105 may communicate, either directly or indirectly, with each other over second backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic coverage area 110. In the present example, the terms evolved Node B (eNodeB or eNB) may be generally used to describe one or more of the base stations 105 of the wireless communications system 100. In additional or alternative embodiments, other types of base stations may be used, including base transceiver stations, radio base stations, access points, radio transceivers, basic service sets (BSSs), extended service sets (ESSs), NodeBs, or Home NodeBs. The geographic coverage area 110 for a base station 105 may be divided into sectors making up only a portion of the coverage area (not shown). The wireless communications system 100 may include base stations 105 of different types (e.g., macro, micro, and/or pico base stations). There may be overlapping coverage areas for different technologies.

In embodiments, one or more aspects of the wireless communications system 100 may implement an LTE/LTE-A network communication system. The wireless communications system 100 may be a Heterogeneous LTE/LTE-A network in which different types of base stations 105 provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs 115 with service subscriptions with the network provider. A pico cell would generally cover a relatively smaller geographic area (e.g., buildings) and may allow unrestricted access by UEs 115 with service subscriptions with the network provider. A femto cell would also generally cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). A base station 105 for a macro cell may be referred to as, for example, a macro eNodeB. A base station 105 for a pico cell may be referred to as, for example, a pico eNodeB. And, a base station 105 for a femto cell may be referred to as, for example, a femto eNodeB or a home eNodeB. A base station 105 may support one or multiple (e.g., two, three, four, and the like) cells. The base stations 105 may implement different radio access technologies (RATs).

The core network 130 may communicate with the base stations 105 or other base stations via first backhaul links 132 (e.g., S1 interface, etc.). The base stations 105 may also communicate with one another, e.g., directly or indirectly via second backhaul links 134 (e.g., X2 interface, etc.) and/or via the first backhaul links 132 (e.g., through core network 130). The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The UEs 115 may be dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with macrocells, picocells, femtocells, relays, and the like. A UE 115 may be able to communicate with base stations 105 using different RATs.

The communication links 125 shown in the wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions.

In certain examples, a multi-mode UE 115-*a* may be capable of simultaneously communicating with base stations 105 associated with different radio access technologies (RATs). For example, UE 115-*a* of FIG. 1 may be able to measure and communicate with an LTE eNodeB 105 and a 1x/EV-DO base station 105. However, certain base stations 105 may be associated with cells that are forbidden to the UE 115-*a*. For example, a cell may be forbidden because it is blocked by Non-Access-Stratum (NAS) (e.g., the base station is in a forbidden Tracking Area (TA) or Location Area (LA)) or by upper layers (e.g., because the base station does not support Circuit-Switched Fall Back (CSFB), Short Message Service (SMS), IP Multimedia Subsystem (IMS) services, or another feature).

In one example, the UE 115-*a* may be camped on a 1x/EV-DO base station 105 and within the geographic coverage area 110 of an LTE eNodeB 105 that does not support CSFB. Without CSFB support, the UE 115 may not be able to place or receive voice calls. Thus, to avoid interruption of service, the LTE eNodeB 105 may be forbidden to the UE 115.

Forbidden cells may be identified on the UE 115-*a* side, the network side, or both. For example, a UE may determine that a CDMA/HDR cell is forbidden in response to a threshold number of access probe failures. In examples where the network identifies forbidden cells, one or more base stations 105 may signal the forbidden cells to the UE 115-*a* (e.g., as part of a Preferred Roaming List).

The existence of forbidden cells may complicate reselection and handovers performed by the UE 115-*a*. The physical layer and radio resource control (RRC) layer (or equivalent) specifications for standard cellular communications do not take forbidden cells into account when performing measurements for reselection and handovers. Thus, in certain examples, the UE 115-*a* may measure and attempt to reselect to a forbidden cell on the basis of signal strength, without taking into account the forbidden status of that cell. Reselection or handovers to forbidden cells may involve unnecessary measurements and increased power consumption.

To avoid forbidden cell reselections by the UE 115-*a*, the UE 115-*a* may be configured to determine that the UE 115-*a* is in a serving cell, identify one or more forbidden neighbor cells while the UE 115-a is in the serving cell, and adjust a measurement interval of the one or more forbidden neighbor cells while the UE is in the serving cell. In certain examples, the UE 115-a may adjust the measurement interval of the one or more forbidden neighbor cells to be longer than the measurement intervals associated with non-forbidden cells. In this way, the UE 115-a may perform measurements of the forbidden neighbor cells less frequently than the UE 115-a performs measurements of the non-forbidden cells. In certain examples, the degree to which the measurement interval of a forbidden neighbor cell is adjusted may be proportional to or otherwise based on the signal strength of the forbidden neighbor cell.

As used herein, the "signal strength" of a neighbor cell may refer to the strength of the signal from the neighbor cell as measured by the UE 115-a, excluding noise and/or interference due to other frequencies.

Figure 2:
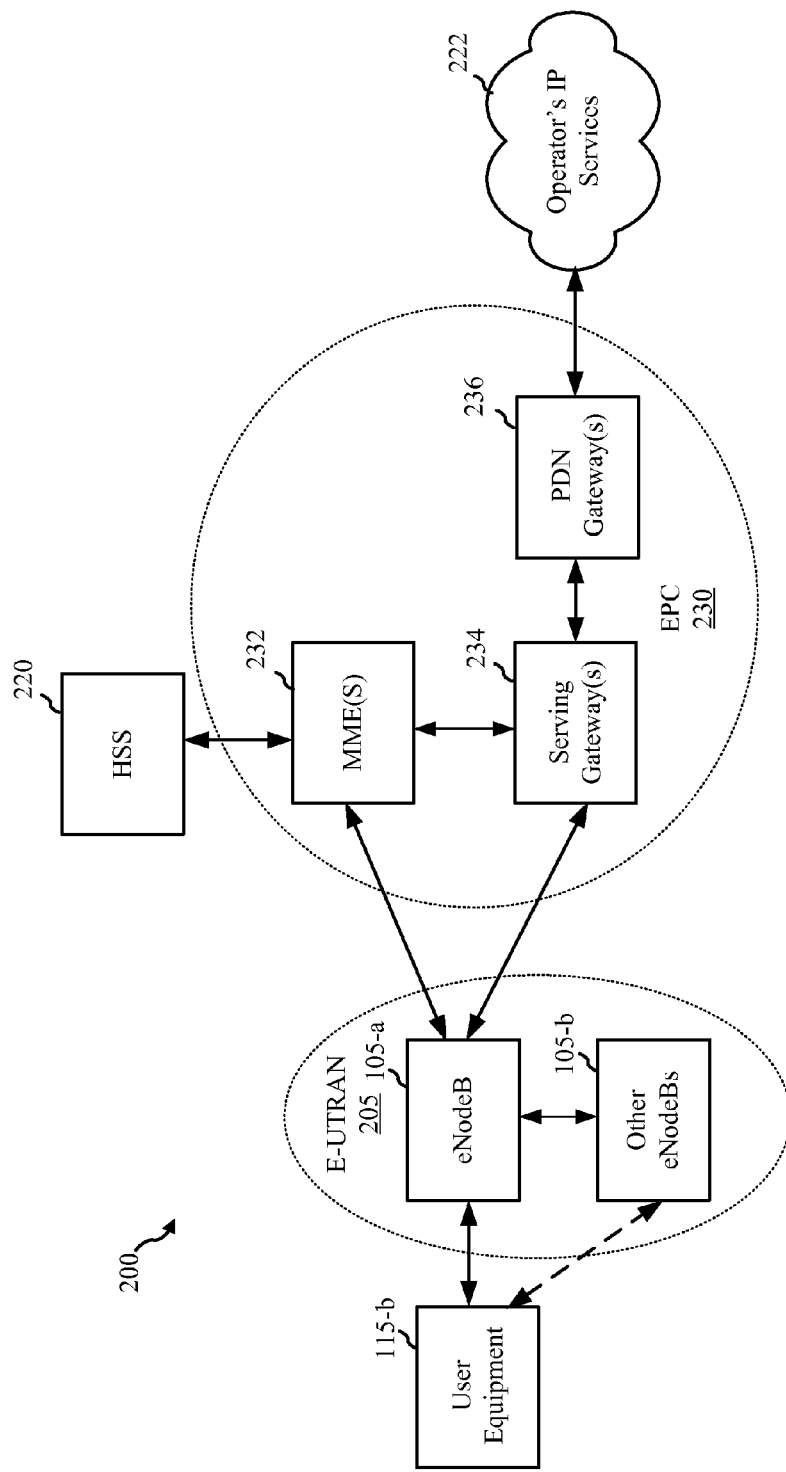
FIG. 2 shows a diagram illustrating an LTE/LTE-Advanced network architecture.

FIG. 2 is a diagram illustrating an LTE/LTE-Advanced network architecture in accordance with various embodiments, and may be an example of a system that forms at least a part of the system 100 of FIG. 1. The LTE/LTE-A network architecture may be referred to as an Evolved Packet System (EPS) 200. The EPS 200 may include one or more UEs 115-b, an Evolved UMTS Terrestrial Radio Access Network (E-UTRAN) 205, an Evolved Packet Core (EPC) 230, a Home Subscriber Server (HSS) 220, and an Operator's IP Services 222. The UE 115-b may be an example of one or more of the UEs 115 described above with reference to FIG. 1. The EPS 200 may interconnect with other access networks, but for simplicity those entities/interfaces are not shown. As shown, the EPS 200 provides packet-switched services, however, as those skilled in the art will readily appreciate, the various concepts presented throughout this disclosure may be extended to networks providing circuit-switched services.

The E-UTRAN 205 may include an eNodeB 105-a and other eNodeBs 105-b. The eNodeB 105-a and eNodeBs 105-b may be examples of one or more of the base stations 105 described above with reference to FIG. 1. The eNodeB 105-a may provide user and control plane protocol terminations toward the UE 115-b. The eNodeB 105-a may be connected to the other eNodeBs 105-b via an X2 interface (e.g., backhaul). The eNodeB 105-a may provide an access point to the EPC 230 for the UE 115-b. The eNodeB 105-a may be connected by an S1 interface to the EPC 230. The EPC 230 may include one or more Mobility Management Entities (MMEs) 232, one or more Serving Gateways 234, and one or more Packet Data Network (PDN) Gateways 236. The MME 232 may be the control node that processes the signaling between the UE 115-b and the EPC 230. Generally, the MME 232 may provide bearer and connection management.

User IP packets may be transferred through the Serving Gateway 234, which itself may be connected to the PDN Gateway 236. The PDN Gateway 236 may provide UE IP address allocation as well as other functions. The PDN Gateway 236 may be connected to the Operator's IP Services 222. The Operator's IP Services 222 may include the Internet, the Intranet, an IP Multimedia Subsystem (IMS), and a Packet-Switched (PS) Streaming Service (PSS). As mentioned above, the MME(s) 232, serving gateway(s) 234, one or more PDN Gateway(s) 236, along with eNodeB(s) 105 may generally be referred to as network entities. As mentioned above, one or more of the UEs 115-b may run one or more applications that have certain preconditions for communications between the UE 115-b and EPC 230. The EPS 200 may interconnect with other access networks using other radio access technologies (RATs). For example, the EPS 200 may interconnect with UTRAN networks and/or CDMA networks.

As discussed above, the UE 115-b may be capable of connecting to multiple RATs. For example, while the UE 115-b may be capable of connecting to and communicating with the EPS 200 over the LTE/LTE-Advanced network architecture, the UE may 115-b may also be capable of connecting to a 3G neighbor cell (e.g., a CDMA2000 1x/EV-DO cell) of an operator that does not support the IP services 222 of operator of the EPS 200. Thus, the 3G neighbor cell may be forbidden to the UE 115-b. Upon determining that the 3G neighbor cell is forbidden, the UE 115-b may adjust a measurement interval of the forbidden 3G neighbor cell such that the UE 115-b measures the channel associated with the forbidden 3G neighbor cell less frequently than channels associated with permitted neighbor cells (e.g., the other eNodeBs 105-b or a 3G neighbor cell that supports the operator's IP services 222).

Figure 3:
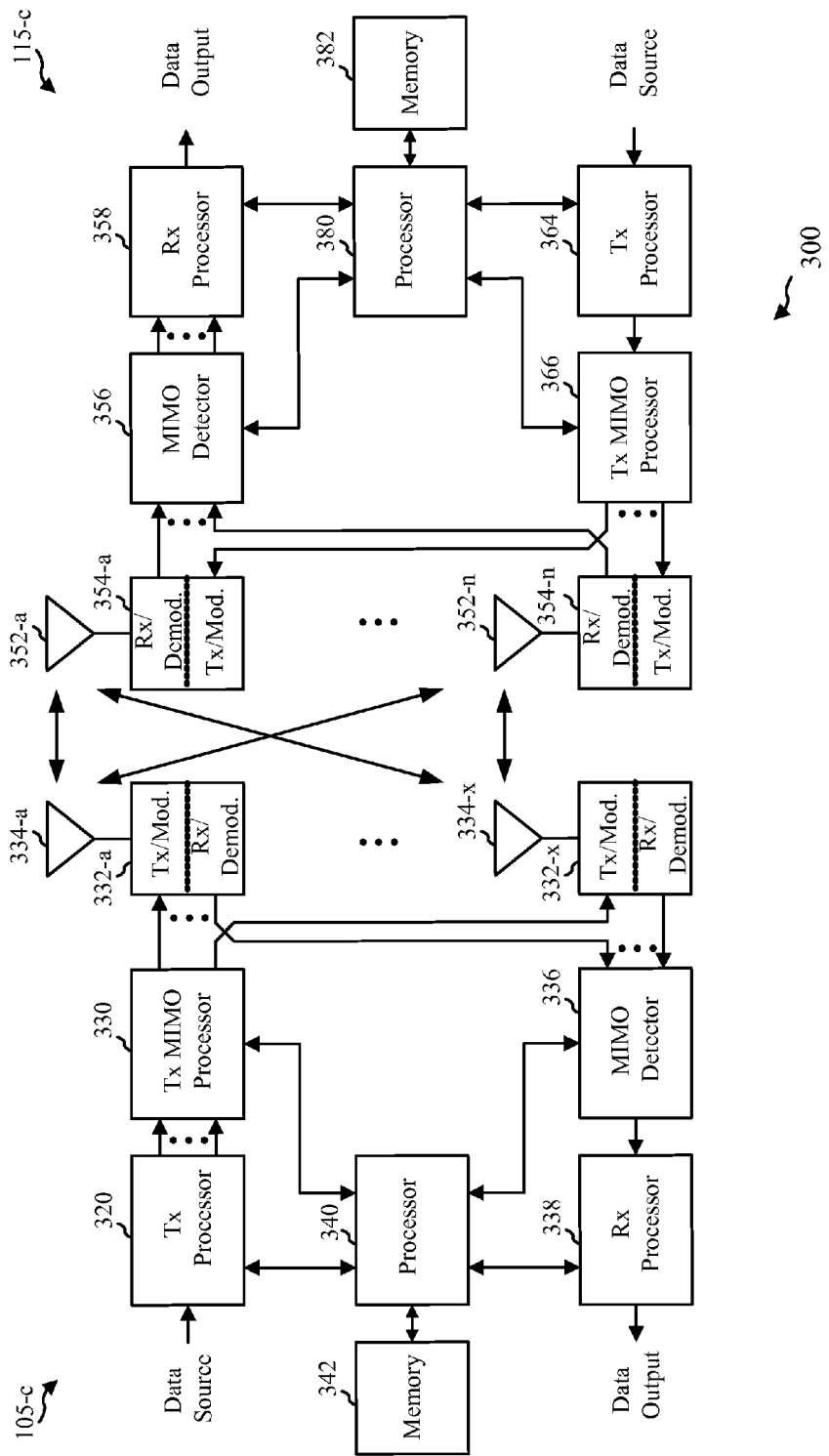
FIG. 3 shows a block diagram of an example base station and UE.

FIG. 3 is a block diagram conceptually illustrating a design of a base station 105-c and a UE 115-c, in accordance with an aspect of the present disclosure. The eNodeB 105-c and UE 115-c may be part of a communication system 300. This system 300 may illustrate aspects of the system 100 of FIG. 1 and/or the EPS 200 of FIG. 2. For example, the base station 105-c may be an example of one or more of the base stations 105, 105-a, 105-b described above with respect to FIG. 1 or 2, and the UE 115-c may be an example of one or more of the UEs 115, 115-a, 115-b described above with respect to FIG. 1 or 2.

The base station 105-c may be equipped with base station antennas 334-a through 334-x, where x is a positive integer, and the UE 115-c may be equipped with UE antennas 352-a through 352-n. In the system 300, the base station 105-c may be able to send data over multiple communication links at the same time. Each communication link may be called a "layer" and the "rank" of the communication link may indicate the number of layers used for communication. For example, in a 2×2 MIMO system where base station 105-c transmits two "layers," the rank of the communication link between the base station 105-c and the UE 115-c is two.

At the base station 105-c, a base station transmit processor 320 may receive data from a base station data source and control information from a base station controller/processor 340. The control information may be for the PBCH, PCFICH, PHICH, PDCCH, etc. The data may be for the PDSCH, etc. The base station transmit processor 320 may process (e.g., encode and symbol map) the data and control information to obtain data symbols and control symbols, respectively. The base station transmit processor 320 may also generate reference symbols, e.g., for the PSS, SSS, and cell-specific reference signal. A base station transmit (TX) MIMO processor 330 may perform spatial processing (e.g., precoding) on data symbols, control symbols, and/or reference symbols, if applicable, and may provide output symbol streams to the base station modulator/demodulators 332-a through 332-x. Each base station modulator/demodulator 332 may process a respective output symbol stream (e.g., for OFDM, etc.) to obtain an output sample stream. Each base station modulator/demodulator 332 may further process (e.g., convert to analog, amplify, filter, and upconvert) the output sample stream to obtain a downlink (DL) signal. In one example, DL signals from base station modulator/demodulators 332-a through 332-x may be transmitted via the base station antennas 334-a through 334-x, respectively.

At the UE 115-c, the UE antennas 352-a through 352-n may receive the DL signals from the base station 105-c and may provide the received signals to the UE modulator/demodulators 354-*a* through 354-*n*, respectively. Each UE modulator/demodulator 354 may condition (e.g., filter, amplify, downconvert, and digitize) a respective received signal to obtain input samples. Each UE modulator/demodulator 354 may further process the input samples (e.g., for OFDM, etc.) to obtain received symbols. A UE MIMO detector 356 may obtain received symbols from all the UE modulator/demodulators 354-*a* through 354-*n*, perform MIMO detection on the received symbols if applicable, and provide detected symbols. A UE receiver (Rx) processor 358 may process (e.g., demodulate, deinterleave, and decode) the detected symbols, providing decoded data for the UE 115-*c* to a data output, and provide decoded control information to a UE controller/processor 380, or UE memory 382.

On the uplink (UL), at the UE 115-*c*, a UE transmit processor 364 may receive and process data from a UE data source. The UE transmit processor 364 may also generate reference symbols for a reference signal. The symbols from the UE transmit processor 364 may be precoded by a UE transmit MIMO processor 366 if applicable, further processed by the UE modulator/demodulators 354-*a* through 354-*n* (e.g., for SC-FDMA, etc.), and be transmitted to the base station 105-*c* in accordance with the transmission parameters received from the base station 105-*c*.

At the base station 105-*c*, the UL signals from the UE 115-*c* may be received by the base station antennas 334, processed by the base station modulator/demodulators 332, detected by a base station MIMO detector 336 if applicable, and further processed by a base station receive processor. The base station receiver processor 338 may provide decoded data to a base station data output and to the base station controller/processor 340.

The components of the UE 115-*c* may, individually or collectively, be implemented with one or more Application Specific Integrated Circuits (ASICs) adapted to perform some or all of the applicable functions in hardware. Each of the noted modules may be a means for performing one or more functions related to operation of the system 300. Similarly, the components of the base station 105-*c* may, individually or collectively, be implemented with one or more Application Specific Integrated Circuits (ASICs) adapted to perform some or all of the applicable functions in hardware. Each of the noted components may be a means for performing one or more functions related to operation of the system 300.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. At the Physical layer, the transport channels may be mapped to Physical channels.

In one configuration, the base station 105-*c* and/or the UE 115-*c* includes means for identifying one or more forbidden neighbor cells. Further, the base station 105-*c* and/or the UE 115-*c* may include means for creating a list of neighbor cells, that may include forbidden neighbor cells. In some cases, the base station 105-*c* and/or the UE 115-*c* includes means for determining signal strength of neighboring cells. Also, the base station 105-*c* and/or the UE 115-*c* may include means for determining whether a UE 115 is in a serving cell. In some cases, the base station 105-*c* and/or the UE 115-*c* may include means for adjusting a measurement interval with respect to neighbor cells, such as forbidden neighbor cells.

In one aspect, the aforementioned means may be the base station controller/processor 340, the base station memory 342, the base station transmit processor 320, base station receiver processor 338, the base station transmit MIMO processor 330, the base station MIMO detector 336, the base station modulator/demodulators 332, and the base station antennas 334 of the base station 105-*c* configured to perform the functions recited by the aforementioned means. In another aspect, the aforementioned means may be the UE controller/processor 380, the UE memory 382, the UE transmit processor 364, UE receiver processor 358, the UE MIMO detector 356, the UE transmit MIMO processor 366, the UE modulator/demodulators 354, and the UE antennas 352 of the UE 115-*c* configured to perform the functions recited by the aforementioned means.

Figure 4A:
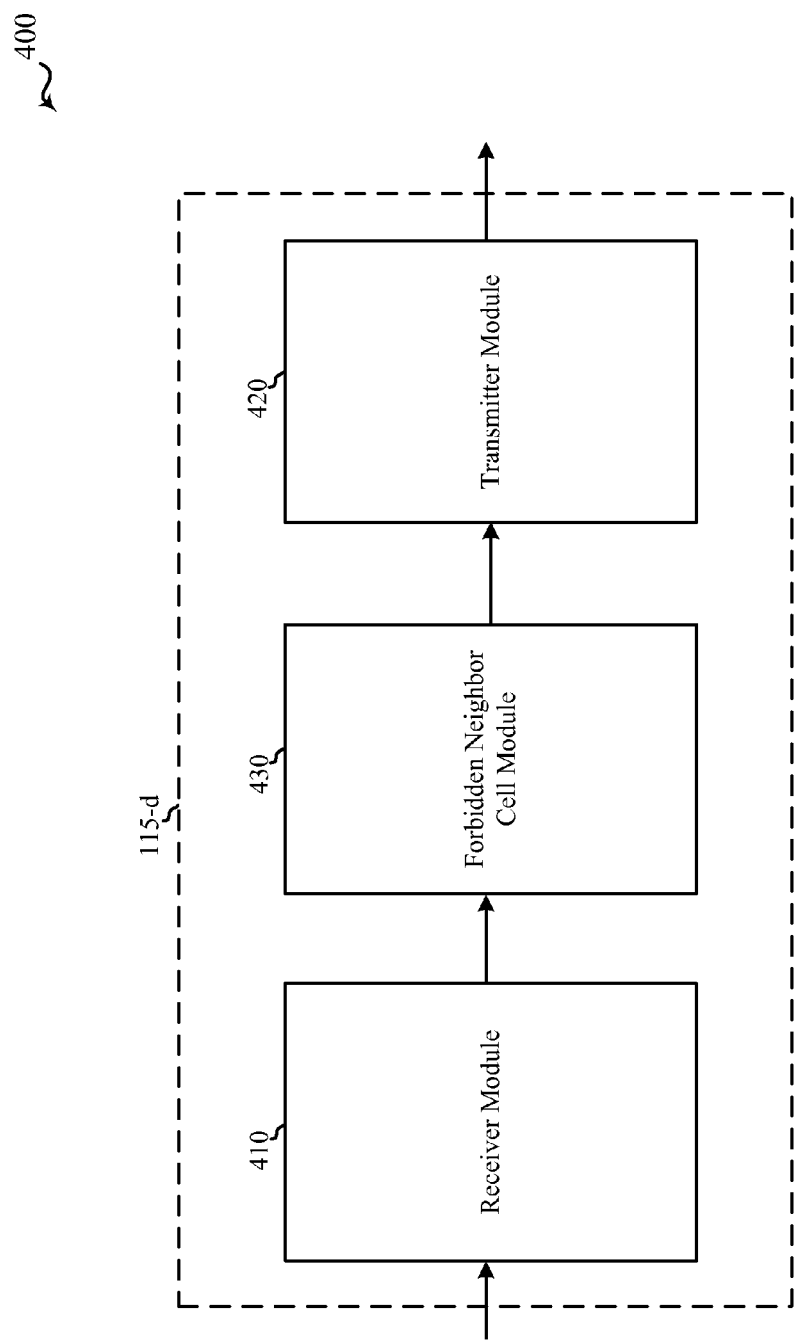
FIGS. 4A and 4B shows a block diagram of an example of a UE.

FIG. 4A is a block diagram 400 illustrating one embodiment of a UE 115-*d* in accordance with the present systems and methods. The UE 115-*d* may be an example of the UE 115 illustrated in FIGS. 1, 2, and/or 3. The UE 115-*d* may include a receiver module 410, a forbidden neighbor cell module 430, and a transmitter module 420. Each of these components may be in communication with each other.

These components of the UE 115-*d* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICS, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one configuration, the receiver module 410 may include a cellular receiver, such as a multi-mode cellular receiver configured to operate over multiple bands and RATs, and may receive transmissions from a base station 105. The receiver module 410 may receive information such as packet, data, and/or signaling information, including information related to a neighbor cell. The received information may be utilized by the forbidden neighbor cell module 430 for a variety of purposes. For example, the forbidden neighbor cell module 430 may utilize the received information to determine if a neighbor cell is forbidden.

In one configuration, the transmitter module 420 may include a cellular transmitter, such as a multi-mode cellular transmitter configured to operate over multiple bands and RATs, and may transmit to a base station 105. The transmitter module 420 may be used to transmit various types of data and/or control signals over a wireless communications system. The data and/or control signals may include various types of uplink transmissions transmitted over various uplink channels. The transmitter module 420 may transmit information related to the forbidden neighbor cell module 430 for a variety of purposes. For example, the transmitter may transmit measurements of one or more neighbor cells, a list of forbidden neighbor cells, and/or an indication of adjustments made to measurement intervals to a base station.

The UE 115-*d* may include the forbidden neighbor cell module 430. The forbidden neighbor cell module 430 may be implemented by a processor and/or memory and/or other special-purpose hardware. The forbidden neighbor cell module 430 may be responsible for a variety of tasks. For example, the forbidden neighbor cell module may determine that the UE 115-*d* is in a serving cell, identify one or more forbidden neighbor cells while the UE 115-*d* is in the serving cell, and adjust a measurement interval of the one or more forbidden neighbor cells while the UE 115-*d* is in the serving cell. In some cases, the forbidden neighbor cell module 430 measures neighbor cell signal strength using the receiver module 410, determines a measurement interval to use, and transmits a list of forbidden neighbor cells to a base station 105 using the transmitter module 420.

Figure 4B:
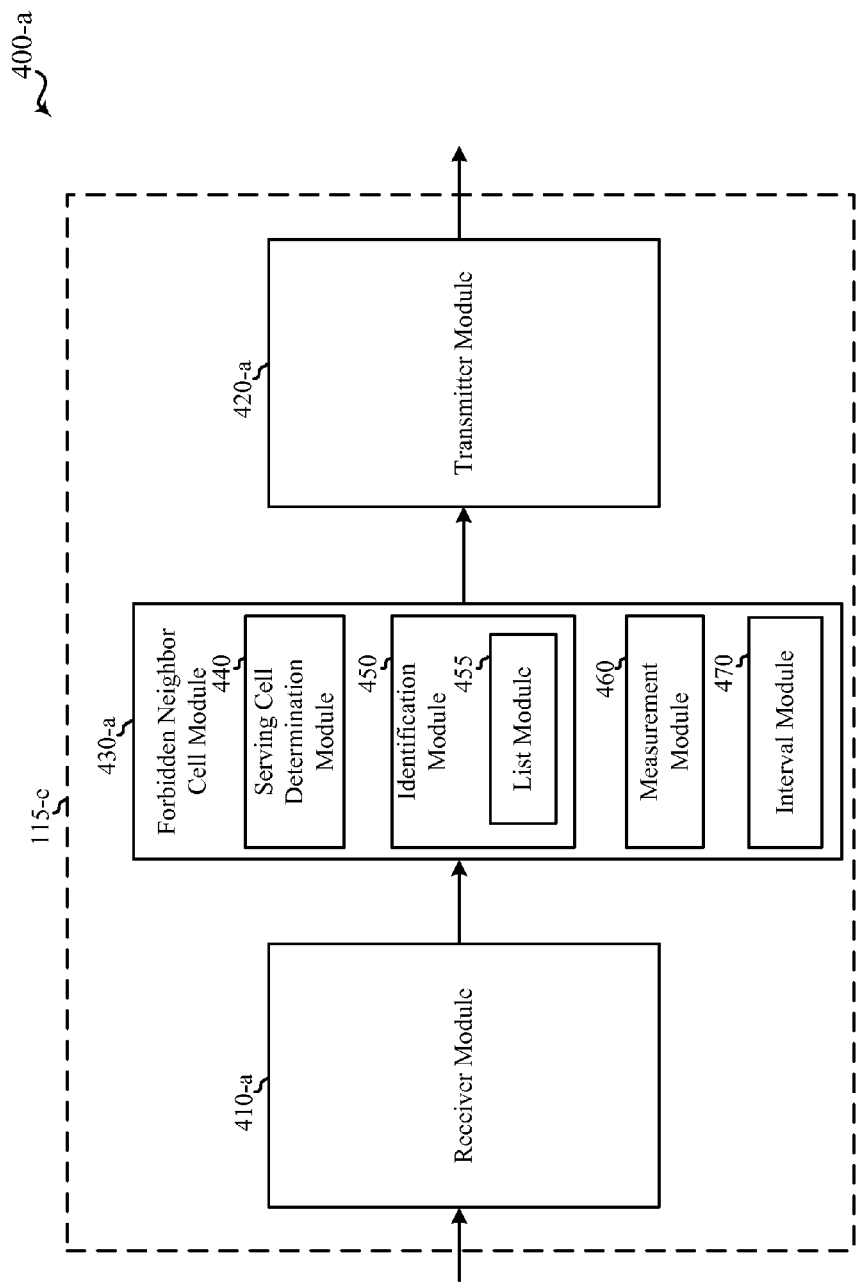

FIG. 4B is a block diagram 400-*a* illustrating one embodiment of a UE 115-*e* in accordance with the present systems and methods. The UE 115-*e* may be an example of one or more of the UEs 115 illustrated in FIGS. 1, 2, 3, and/or 4A. The UE 115-*e* may include a receiver module 410-*a*, a forbidden neighbor cell module 430-*a*, and a transmitter module 420-*a*. Each of these components may be in communication with each other.

These components of the UE 115-*e* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICS, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In the present example, the forbidden neighbor cell module 430-*a* includes a serving cell determination module 440, an identification module 450, a measurement module 460, and an interval module 470.

The serving cell determination module 440 may determine whether the UE 115-*e* is in a serving cell. This determination may be based on a current mode of the UE 115-*e*. For example, the serving cell determination module 440 may determine that the UE 115-*e* is in the serving cell based on the fact that the UE 115-*e* is currently camped on the serving cell in idle mode.

The identification module 450 may be configured to identify one or more forbidden neighbor cells while the UE 115-*e* is camped on or connected to the serving cell. The one or more forbidden neighbor cells may be identified based on messaging received from the current serving cell or a previous serving cell. For example, the UE 115-*e* may receive the identity of one or more forbidden neighbor cells over non-access stratum (NAS) signaling indicating that the one or more forbidden neighbor cells are associated with a forbidden tracking area or location area.

Additionally or alternatively, the UE 115-*e* may receive the identity of the one or more forbidden neighbor cells from upper layers of the network, such as in a message or other indication that that the forbidden neighbor cell(s) fail to support a certain feature (e.g., CFSB, SMS, IMS services, etc.). Additionally or alternatively, the UE 115-*e* may receive the identity of one or more forbidden neighbor cells from the network using a preferred roaming list (PRL) that expressly or implicitly names the forbidden cell(s) or the channels or operating frequencies associated with the forbidden cell(s). The identification module 450 may include a list module 455 that compiles and stores the identity of the forbidden neighbor cells known to the UE 115-*e*.

The measurement module 460 may be used to perform measurements on neighbor cells to identify possible targets for reselection (e.g., when the UE 115-*e* is in idle mode) or handover (e.g., when the UE 115-*e* is in connected mode). The frequency with which channels or operating frequencies associated with the neighboring cells are measured may be determined by a measurement interval set for each neighboring cell. In the event that a specific measurement interval is not set for a neighboring cell, a default measurement interval may be used.

The interval module 470 may adjust a measurement interval of the one or more identified forbidden neighbor cells while the user is in the serving cell. In certain examples, the interval module 470 may make a uniform adjustment to the measurement interval of a neighbor cell based on the binary determination that the neighbor cell is forbidden. In such examples, all forbidden neighboring cells may be assigned the same measurement interval, which may be longer than the measurement intervals assigned to the permitted cells.

Alternatively, the measurement interval of the forbidden neighbor cell(s) may be further based on a measured signal strength of each forbidden neighbor cell. In some cases, the interval module 470 may adjust the measurement interval of one or more forbidden neighbor cells using a finite number of discrete measurement interval factors in conjunction with a base measurement interval. Thus, the measurement interval adjustment for a given forbidden neighbor cell may be selected according to a determination of whether a signal strength measurement of the forbidden neighbor cell satisfies one or more thresholds.

Figure 5:
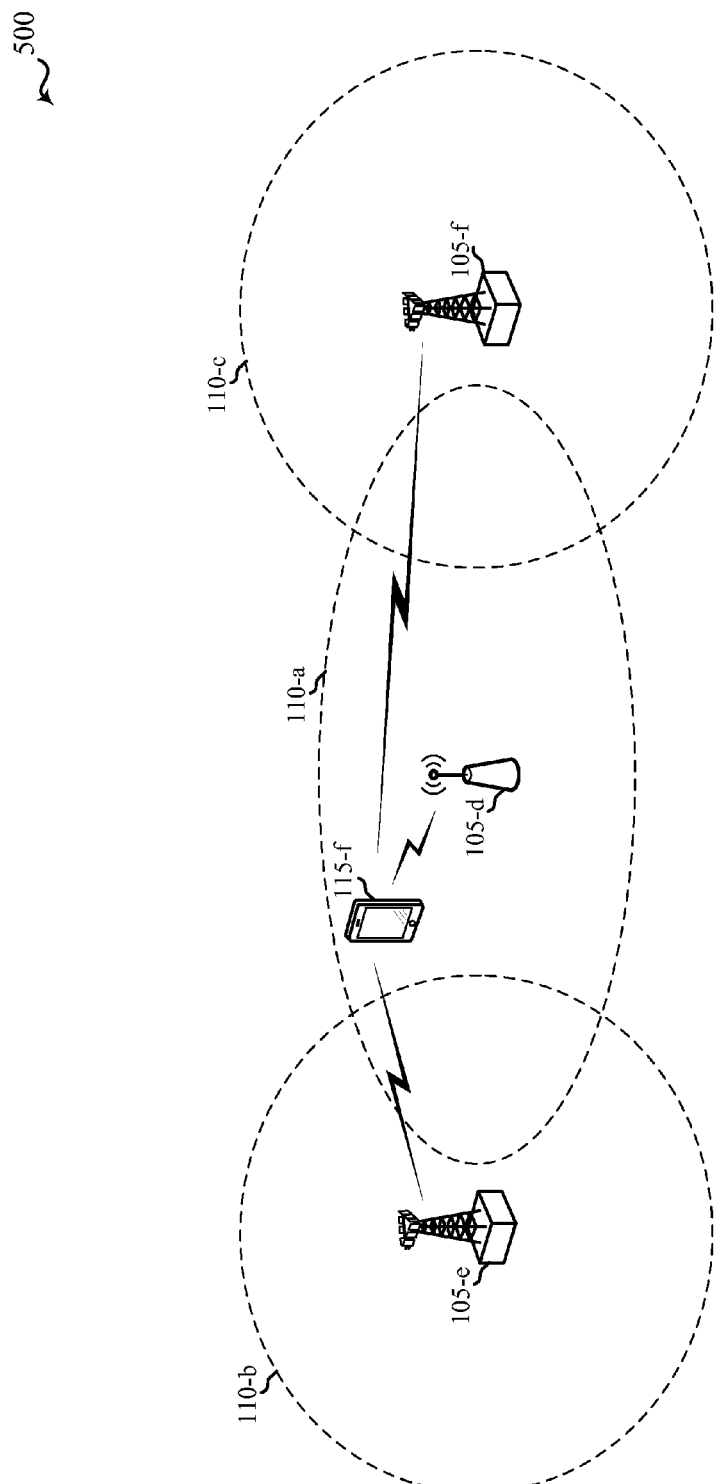
FIG. 5 shows a block diagram conceptually illustrating an example of a wireless communications system.

FIG. 5 is a block diagram conceptually illustrating an example of a wireless communications system 500, in accordance with an aspect of the present disclosure. The wireless communications system 500 may include UEs 115, and base stations 105 with coverage areas 110. The UE 115-*f* may be an example of one or more of the UEs 115 illustrated in FIGS. 1, 2, 3, 4A and/or 4B. The base stations 105-*d*, 105-*e*, 105-*f* may be an example of one or more of the base stations 105 illustrated in FIGS. 1, 2, and/or 3. The coverage areas 110-*a*, 110-*b*, and 110-*c* may be an example of the coverage areas 110 illustrated in FIG. 1. Each base station 105-*d*, 105-*e*, 105-*f* may be associated with a separate cell that is coextensive with its respective coverage area 110. The UE 115-*f* may be within the coverage area 110-*a* of a serving cell with base station 105-*d*. The UE 115-*f* may receive from a base station 105-*d*, 105-*e*, or 105-*f* a list of neighbor cells, which may include forbidden cells. In the present example, the cells of base stations 105-*e* and 105-*f* are forbidden. The forbidden cells may not overlap due to issues with interference. In an embodiment, the serving cell may be a 2G or 3G cell associated with base station 105-*d*, and the forbidden cells associated with base stations 105-*e* and 105-*f* are LTE cells.

The UE 115-*f* may periodically perform measurements, e.g., inter-RAT cell measurements, on the forbidden cells. The inter-RAT cell measurements may include signal strength measurements. In some cases, the UE 115-*f* performs measurements at a base measurement interval, such as every x milliseconds (ms), for example every 10 ms. Based on the signal strength measurements, the UE 115-*f* may determine a measurement interval factor to be multiplied by the base measurement interval to establish a new rate of measurement. For example, if the forbidden cell of base station 105-*e* has a signal strength that satisfies a first threshold, the forbidden cell of base station 105-*e* may be assigned a measurement interval factor of 10. In some cases, assuming the forbidden cell of base station 105-*f* has a stronger signal strength when compared to the forbidden cell of base station 105-*e*, the forbidden cell of base station 105-*f* may satisfy a second threshold, greater than the first threshold, and be assigned a measurement interval factor of 20. Thereafter the UE 115-*f* may measure the forbidden cell of base station 105-*e* every 10× ms, for example every 100 ms, and may measure the forbidden cell of base station 105-*f* every 20× milliseconds, for example every 200 ms. The measurement interval factor may increase with the signal strength of the measured cell. It should be noted the preceding numbers are meant as illustrative embodiments and are not meant to be limiting in scope.

Figure 6:
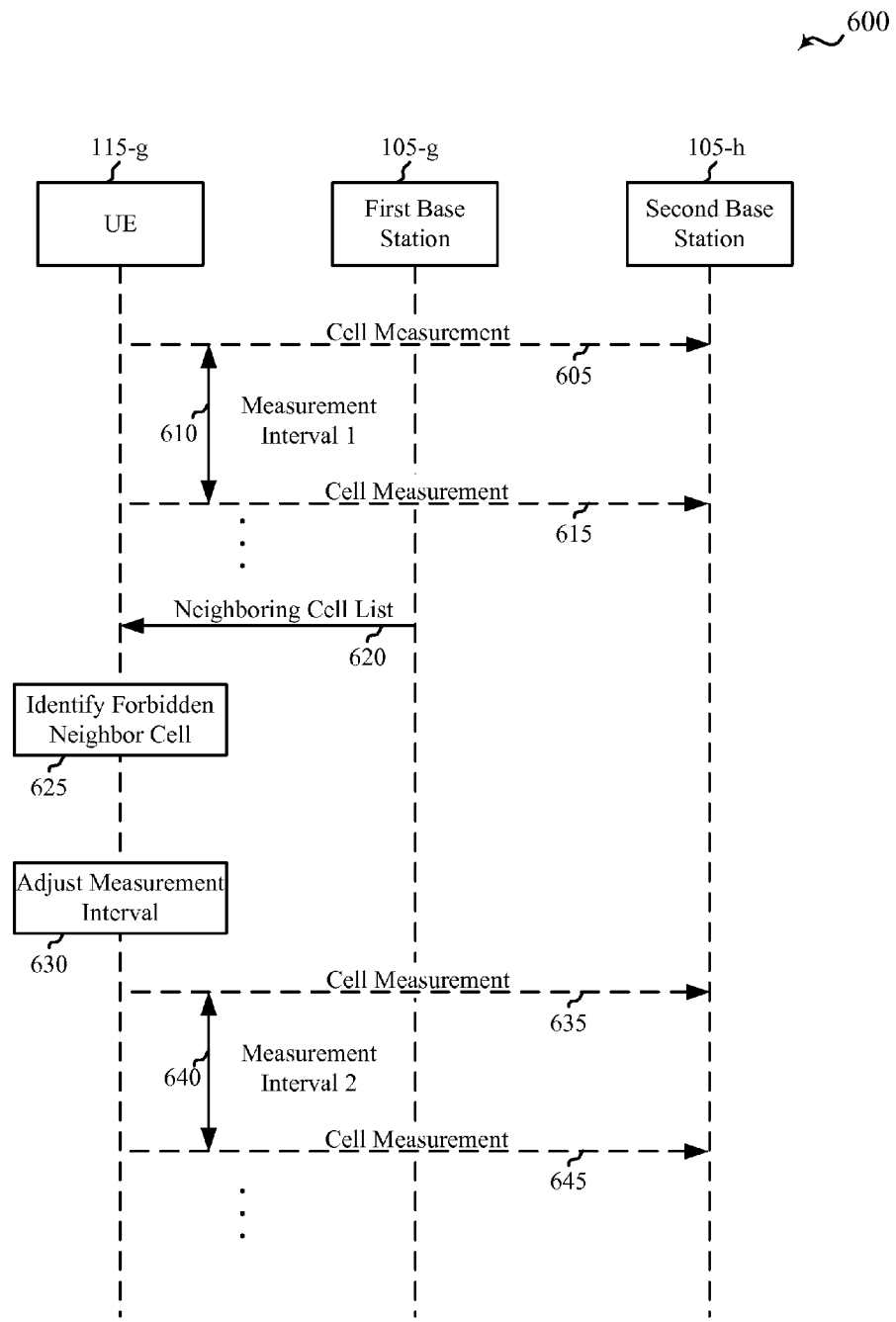
FIG. 6 is a flow diagram illustrating an example of a wireless communications system.

FIG. 6 is a flow diagram illustrating an example of a wireless communications system 600, in accordance with an aspect of the present disclosure. The wireless communications system 600 may include a UE 115-*g*, a first base station 105-*g*, and a second station 105-*h*. The UE 115-*g* may be an example of one or more of the UEs 115 illustrated in FIGS. 1, 2, 3, 4A, 4B, and/or 5. The base stations 105-*g* and 105-*h* may be examples of one or more of the base stations 105 illustrated in FIGS. 1, 2, 3, and/or 5.

The first base station 105-*g* may operate as a serving cell for the UE 115-*g*. In certain examples, the UE 115-*g* may be camped on the serving cell of the first base station 105-*g* in idle mode throughout the example of FIG. 6. At block 605, the UE 115-*g* may measure a neighboring cell associated with the second base station 105-*h*. The neighboring cell may be utilize a different RAT from the serving cell associated with the first base station 105-*g*. Additionally or alternatively, the neighboring cell may not support a feature supported by the serving cell associated with the first base station 105-*g*.

At block 615, the UE 115-*g* may perform another measurement of the neighboring cell associated with the second base station 105-*h*, after a first measurement interval 610. The UE 115-*g* may continue to perform the measurement of the neighboring cell associated with the second base station 105-*h* periodically, after the expiration of the first measurement interval 610. A block 620, the UE 115-*g* may receive a neighboring cell list from the first base station 105-*g*. In some cases, the neighboring cell list may include forbidden cells. At block 625, the UE 115-*g* may identify the neighbor cell associated with the second base station 105-*h* as forbidden. At block 630, the UE 115-*g* may adjust the first measurement interval 610, based at least on the determination that the neighbor cell of the second base station 105-*h* is forbidden. In certain examples, the adjustment may be further based on one or more signal strength measurements of the second base station 105-*h*, such as cell measurements performed in block 605 and/or block 615.

In some cases, the measurement interval adjustment includes multiplying the measurement interval by a measurement interval factor. At block 635, the UE 115-*g* may continue to periodically measure the neighbor cell associated with the second base station 105-*h*. Block 640 illustrates that the next measurement 645 of the neighbor cell associated with the second base station 105-*h* will occur after a new, second measurement interval, which may be the product of the measurement interval factor determined in block 630 and the first measurement interval 610. The UE 115-*g* may continue to measure the neighboring cell associated with the second base station 105-*h* at the second measurement interval until the neighbor cell of the second base station 105-*h* is no longer classified as forbidden, the signal strength changes to a degree that would trigger a new adjustment to the measurement interval factor, and/or a timer expires.

Figure 7:
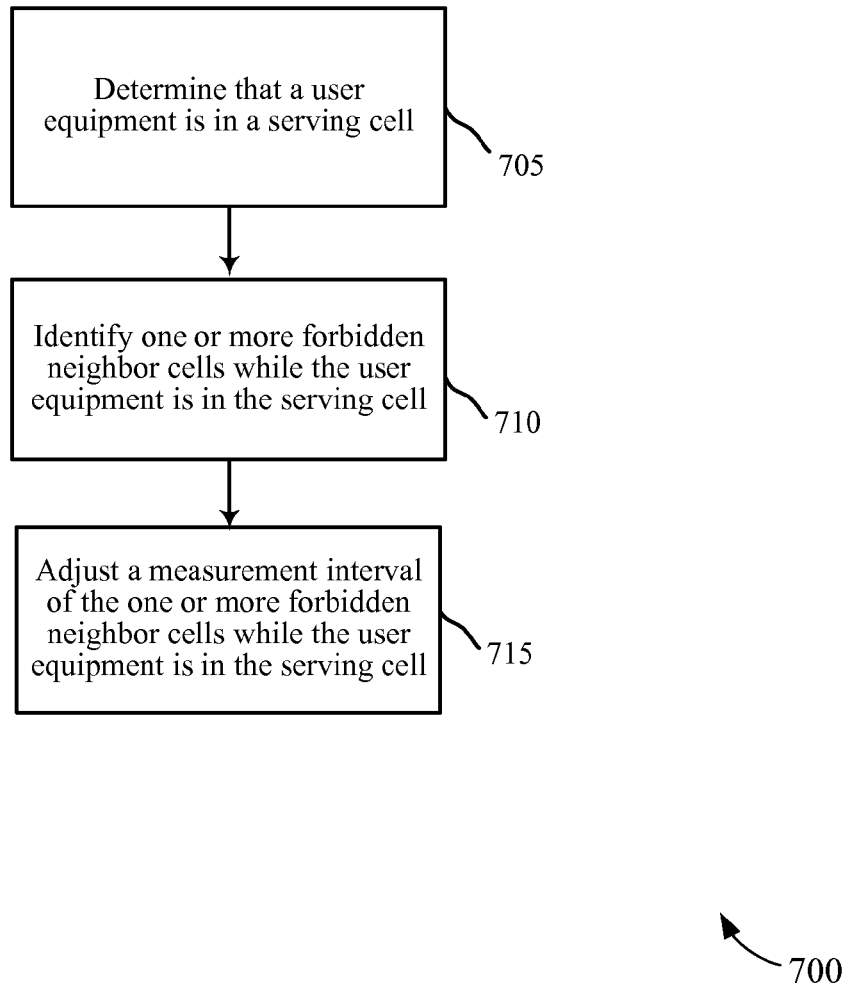
FIG. 7 is a flow diagram illustrating an example of a method of determining a measurement interval factor.

FIG. 7 is a flowchart conceptually illustrating an example of a method 700 of wireless communication, in accordance with an aspect of the present disclosure.

Specifically, FIG. 7 illustrates a method 700 of reducing inter-RAT cell measurements in a wireless communication system. The method 700 may be performed, for example, by one more of the UEs, base stations, or other devices described above with reference to the previous Figures. Thus, one or more components of these devices may be means for performing the method 700 of FIG. 7.

At block 705, it may be determined that a UE is in a serving cell. This determination may be made based on the UE being camped on the serving cell in an idle mode or in a connected mode with an active connection to the serving cell. At block 710, one or more forbidden neighbor cells may be identified while the user equipment is in the serving cell. The forbidden neighbor cells may be identified based on one or more criteria known to the UE, and/or by active signaling received from the network. At block 715, a measurement interval of the one or more forbidden neighbor cells may be adjusted while the user equipment is in the serving cell. For example, the measurement interval of a forbidden neighbor cell may be extended beyond a default measurement interval such that the UE performs measurements of the forbidden neighbor cell less frequently than non-forbidden neighbor cells.

Figure 8:
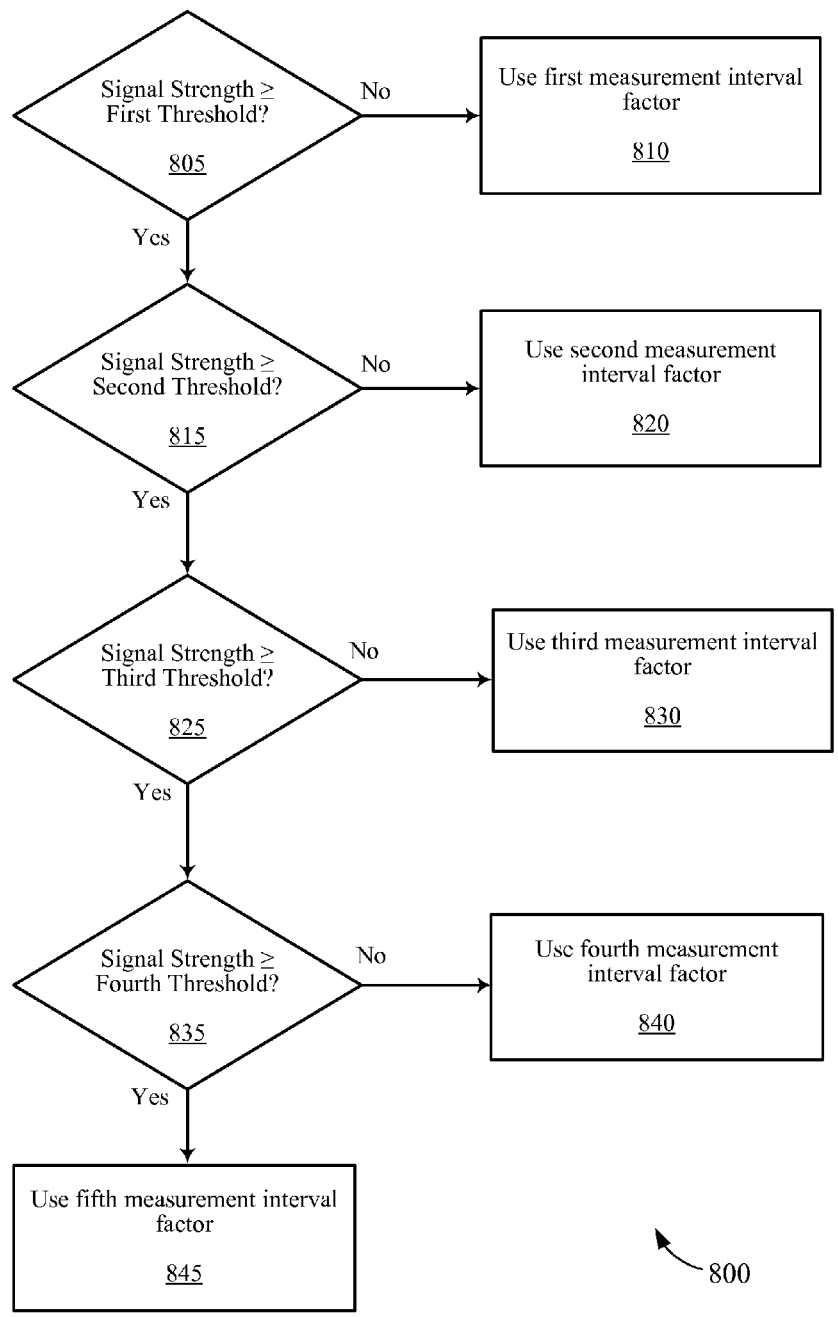
FIG. 8 is a flowchart conceptually illustrating an example of a method of wireless communication.

FIG. 8 is a flow diagram illustrating an example of a method 800 of determining a measurement interval factor for a forbidden neighbor cell, in accordance with an aspect of the present disclosure. The method 800, may be performed by one or more of the UEs 115 and/or base stations 105 described above with respect to the previous Figures. Thus, one or more components of these devices may be means for performing the method 800 of FIG. 8.

The method 800 of FIG. 8 may be an example of block 715 of the method 700 of FIG. 7. At block 805, a measured signal strength, such as received signal strength indication (RSSI) divided by received signal code power (RSCP), may be compared to a first threshold. If the measured signal strength does not satisfy the first threshold (block 805, No), a first measurement interval factor may be used as the basis of the measurement interval of the forbidden neighbor cell at block 810. If the measured signal strength satisfies the first threshold (block 805, Yes), then flow may proceed to block 815 where the measured signal strength is compared to a second threshold. If the measured signal strength does not satisfy the second threshold (block 815, No), a second measurement interval factor may be used as the basis of the measurement interval of the forbidden neighbor cell at block 820. If the measured signal strength satisfies the second threshold (block 815, Yes), then flow may proceed to block 825 where the measured signal strength is compared to a third threshold. If the measured signal strength does not satisfy the third threshold (block 825, No), a third measurement interval factor is used as the basis of the measurement interval of the forbidden neighbor cell at block 830. If the measured signal strength satisfies the third threshold (block 825, Yes), then the flow may proceed to block 835 where the measured signal strength is compared to a fourth threshold. If the measured signal strength does not satisfy the fourth threshold (block 835, No), a fourth measurement interval factor is used as the basis of the measurement interval of the forbidden neighbor cell at block 840. If the measured signal strength satisfies the fourth threshold (block 835, Yes), then flow proceeds to block 845 and a fifth measurement interval factor is used as the basis of the measurement interval of the forbidden neighbor cell.

In some cases, the fourth threshold may be greater than the third threshold, which may be greater than the second threshold, which may be greater than the first threshold. The fifth measurement interval factor may be greater than the fourth measurement interval factor, which may be greater than the third measurement interval factor, which may be greater than the second measurement interval factor, which may be greater than the first measurement interval factor. It should be noted that in the illustrated embodiment four different signal strength thresholds are used and five different measurement interval factors are used. These quantities are meant as illustrative only and are not limiting in scope. The method may contain more or fewer signal strength measurements and may include more or fewer measurement interval factors.

The following table, Table 1, illustrates an example of a set of signal strengths and accompanying measurement interval factors for an identified forbidden neighbor cell, as could be used in the method 800 of FIG. 8:

TABLE 1

| Signal Strength | Measurement Interval Factor |
| --- | --- |
| −40 to −50 dBm | 50 |
| −50 to −60 dBm | 40 |
| −60 to −70 dBm | 30 |
| −70 to −80 dBm | 20 |
| −80 to −100 dBm | 10 |
| −100 to −120 dBm | 5 |
| <−120 dBm | 1 |

In Table 1, the measurement interval factors represent positive integer scalars that may be multiplied by a base measurement interval (e.g., 10 ms). Table 1 is meant as an example only, and is not limiting in scope. Signal strength measurements as well as measurement interval factors may be different. Further there may be more or fewer signal strength ranges as well as more or fewer measurement interval factors.

Figure 9:
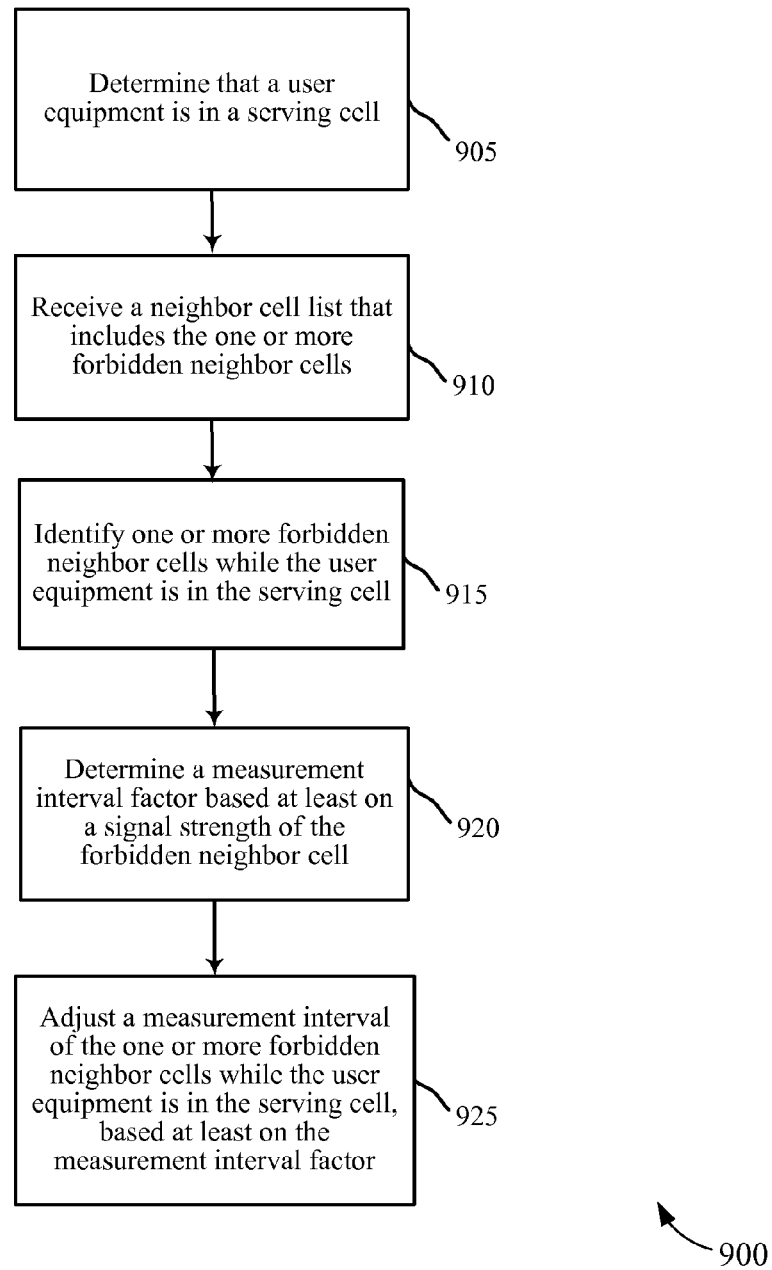
FIG. 9 is a flowchart conceptually illustrating an example of a method of wireless communication.

FIG. 9 is a flowchart conceptually illustrating an example of a method 900 of wireless communication, in accordance with an aspect of the present disclosure. Specifically, FIG. 9 illustrates a method 900 of reducing inter-RAT cell measurements in a wireless communication system. The method 900, may be performed by one or more of the UEs 115 and/or base stations 105 described above with respect to the previous Figures. Thus, one or more components of these devices may be means for performing the method 900 of FIG. 9.

At block 905, it may be determined that a user equipment is in a serving cell. At block 910, a neighbor cell list may be received which may include the one or more forbidden neighbor cells. At block 915, one or more forbidden neighbor cells may be identified while the user equipment is in the serving cell. At block 920, a measurement interval factor may be determined based at least on a signal strength of the forbidden neighbor cell. At block 925, a measurement interval of the one or more forbidden neighbor cells may be adjusted while the user equipment is in the serving cell, based at least on the measurement interval factor.

It will be apparent to those skilled in the art that the methods 700, 800, 900 of FIGS. 7-9 are but illustrative implementations of the tools and techniques described herein. The methods 700, 800, 900 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, the method comprising:
   determining that a user equipment (UE) is in a serving cell associated with a first radio access technology (RAT);
   identifying at least one forbidden neighbor cell associated with a second RAT while the UE is in the serving cell, wherein the first RAT is different from the second RAT; and
   adjusting a measurement interval of the at least one forbidden neighbor cell while the UE is in the serving cell, wherein the adjusting the measurement interval comprises increasing the measurement interval by a measurement interval factor.

2. The method of claim 1, further comprising:
   receiving a neighbor cell list that includes the at least one forbidden neighbor cell.

3. The method of claim 1, wherein adjusting the measurement interval of the at least one forbidden neighbor cell occurs while the UE is in an idle mode.

4. The method of claim 1, wherein the at least one forbidden neighbor cell comprises a first forbidden neighbor cell and a second forbidden neighbor cell, and wherein the adjusting the measurement interval comprises:
   adjusting a first measurement interval of the first forbidden neighbor cell according to a first measurement interval factor; and
   adjusting a second measurement interval of the second forbidden neighbor cell according to a second measurement interval factor, wherein the first measurement interval factor is different from the second measurement interval factor.

5. The method of claim 1, further comprising:
   measuring a signal strength of the at least one forbidden neighbor cell, wherein the measurement interval factor is based on the signal strength of the at least one forbidden neighbor cell.

6. The method of claim 5, wherein the measurement interval factor increases as the signal strength of the at least one forbidden neighbor cell increases.

7. The method of claim 5, wherein the increasing the measurement interval comprises:
   determining if the signal strength of the at least one forbidden neighbor cell satisfies one or more signal strength thresholds.

8. The method of claim 5, wherein the increasing the measurement interval comprises:
   increasing the measurement interval by a first measurement interval factor if the signal strength satisfies a first signal strength threshold; and
   increasing the measurement interval by a second measurement interval factor if the signal strength satisfies a second signal strength threshold.

9. The method of claim 8, wherein the second signal strength threshold is greater than the first signal strength threshold and the second measurement interval factor is greater than the first measurement interval factor.

10. An apparatus for wireless communication, comprising:
    at least one processor; and
    a memory communicatively coupled with the at least one processor, wherein the at least one processor is configured to execute code stored on the memory to:
        determine that a user equipment (UE) is in a serving cell associated with a first radio access technology (RAT);
        identify at least one forbidden neighbor cell associated with a second RAT while the UE is in the serving cell, wherein the first RAT is different from the second RAT; and
        adjust a measurement interval of the at least one forbidden neighbor cell by increasing a measurement interval factor of the measurement interval while the UE is in the serving cell.

11. The apparatus of claim 10, wherein the at least one processor is further configured to execute code stored on the memory to:
    receive a neighbor cell list that includes the at least one forbidden neighbor cell.

12. The apparatus of claim 10, wherein the adjusting of the measurement interval of the at least one forbidden neighbor cell occurs while the UE is in an idle mode.

13. The apparatus of claim 10, wherein the at least one forbidden neighbor cell comprises a first forbidden neighbor cell and a second forbidden neighbor cell, and wherein the at least one processor is further configured to execute code stored on the memory to:
    adjust a first measurement interval of the first forbidden neighbor cell according to a first measurement interval factor;
    adjust a second measurement interval of the second forbidden neighbor cell according to a second measurement interval factor, wherein the first measurement interval factor is different from the second measurement interval factor.

14. The apparatus of claim 10, wherein the at least one processor is further configured to execute code stored on the memory to:
    measure a signal strength of the at least one forbidden neighbor cell, wherein the measurement interval factor is based on the signal strength of the at least one forbidden neighbor cell.

15. The apparatus of claim 14, wherein the measurement interval factor increases as the signal strength of the at least one forbidden neighbor cell increases.

16. The apparatus of claim 14, wherein the at least one processor is further configured to execute code stored on the memory to:
    determine if the signal strength of the at least one forbidden neighbor cell satisfies one or more signal strength thresholds.

17. The apparatus of claim 14, wherein the at least one processor is further configured to execute code stored on the memory to:

increase the measurement interval by a first measurement interval factor if the signal strength satisfies a first signal strength threshold; and increase the measurement interval by a second measurement interval factor if the signal strength satisfies a second signal strength threshold.

18. The apparatus of claim 17, wherein the second signal strength threshold is greater than the first signal strength threshold; and the second measurement interval factor is greater than the first measurement interval factor.

19. An apparatus for wireless communication, comprising:

means for determining that a user equipment (UE) is in a serving cell associated with a first radio access technology (RAT);

means for identifying at least one forbidden neighbor cell associated with a second RAT while the UE is in the serving cell, wherein the first RAT is different from the second RAT; and means for adjusting a measurement interval of the at least one forbidden neighbor cell while the UE is in the serving cell, wherein the means for adjusting the measurement interval comprises means for increasing the measurement interval by a measurement interval factor.

20. The apparatus of claim 19, further comprising:

means for receiving a neighbor cell list that includes the at least one forbidden neighbor cell.

21. The apparatus of claim 19, wherein the at least one forbidden neighbor cell comprises a first forbidden neighbor cell and a second forbidden neighbor cell, and wherein the means for adjusting the measurement interval comprises:

means for adjusting a first measurement interval of the first forbidden neighbor cell according to a first measurement interval factor;

means for adjusting a second measurement interval of the second forbidden neighbor cell according to a second measurement interval factor, wherein the first measurement interval factor is different from the second measurement interval factor.

22. The apparatus of claim 19, further comprising:

means for measuring a signal strength of the at least one forbidden neighbor cell, wherein the measurement interval factor is based on the signal strength of the at least one forbidden neighbor cell.

23. The apparatus of claim 22, wherein the measurement interval factor increases as the signal strength of the at least one forbidden neighbor cell increases.

24. The apparatus of claim 22, wherein the means for increasing the measurement interval comprises:

means for determining if the signal strength of the at least one forbidden neighbor cell satisfies one or more signal strength thresholds.

25. The apparatus of claim 22, wherein the means for increasing the measurement interval comprises:

means for increasing the measurement interval by a first measurement interval factor if the signal strength satisfies a first signal strength threshold; and means for increasing the measurement interval by a second measurement interval factor if the signal strength satisfies a second signal strength threshold.

26. A non-transitory computer-readable medium storing code for wireless communication, the code comprising instructions executable to:

determine that a user equipment (UE) is in a serving cell associated with a first radio access technology (RAT);

identify at least one forbidden neighbor cell associated with a second RAT while the UE is in the serving cell, wherein the first RAT is different from the second RAT; and adjust a measurement interval of the at least one forbidden neighbor cell by increasing a measurement interval factor of the measurement interval while the UE is in the serving cell.

* * * * *